United States Patent [19]
Gloudeman et al.

[11] Patent Number: 6,028,998
[45] Date of Patent: Feb. 22, 2000

[54] APPLICATION FRAMEWORK FOR CONSTRUCTING BUILDING AUTOMATION SYSTEMS

[75] Inventors: Jeffrey J. Gloudeman, Franklin; Donald A. Gottschalk, Wauwatosa; David E. Rasmussen, Dousman; Nicholas J. Ruppert, Milwaukee; Barrett G. Wainscott, Jr., Waukesha, all of Wis.

[73] Assignee: Johnson Service Company, Milwaukee, Wis.

[21] Appl. No.: 09/054,689

[22] Filed: Apr. 3, 1998

[51] Int. Cl.[7] .................................................. G06F 9/445
[52] U.S. Cl. .................... 395/701; 395/701; 395/702; 395/703; 395/704; 395/705; 395/706; 395/707; 395/708
[58] Field of Search ................................. 395/701, 702, 395/703

[56] References Cited

U.S. PATENT DOCUMENTS

| | | | |
|---|---|---|---|
| 5,550,563 | 8/1996 | Matheny et al. | 345/168 |
| 5,623,591 | 4/1997 | Cseri | 395/326 |
| 5,787,425 | 7/1998 | Bigus | 707/6 |
| 5,809,235 | 9/1998 | Sharma et al. | 709/230 |
| 5,809,507 | 9/1998 | Cavanaugh, III | 707/103 |
| 5,848,291 | 12/1998 | Milne et al. | 345/302 |

OTHER PUBLICATIONS

Microsoft Foundation Class Library, "Microsoft Visual C++", Microsoft Co., pp. 3–48, 1993.
Microsoft, "Component Object Model Programming Interface", Microsoft Co., Chapter 2, 1997.
Microsoft, "Objects and Interfaces", Microsoft Co., Chapter 3, 1997.
Richard E. Pattis, "Teaching OOP in C++ Using an Artificial Life Framework", ACM, pp. 39–43, 1997.

Primary Examiner—Tariq R. Hafiz
Assistant Examiner—Ted T. Vo
Attorney, Agent, or Firm—Quarles & Brady LLP

[57] ABSTRACT

The building automation application framework defines an object-oriented class hierarchy in which a standard object superclass defines a plurality of different standard objects that may be assembled by a system designer into larger and more complex building automation systems. The standard objects include a view component that handles implementation details of displaying that object's contents on a standardized or generic user interface browser. The standard object also includes a command component that identifies to other objects what methods may be invoked by that object, thereby relieving the system developer from attending to this programming detail. The application framework defines a building automation model that is application-centric, as opposed to device-centric. Applications are constructed by interconnecting standard objects, assemblies formed from standard objects, and other application objects.

4 Claims, 4 Drawing Sheets

APPLICATION FRAMEWORK FOR CONSTRUCTING BUILDING AUTOMATION SYSTEMS

BACKGROUND AND SUMMARY OF THE INVENTION

The present invention relates generally to building automation systems. More particularly, the invention relates to a software application development system or framework to facilitate constructing complex building automation applications, including applications that may be distributed across multiple nodes on a network.

Sophisticated building automation software systems, such as those intended for distribution across multiple nodes on a network, can take many thousands of programmer hours to construct and test. Currently, there are few application tools to aid developers in building complex systems of this nature. Much of the system design remains an art form that system developers learn only through experience. Under this conventional application development paradigm much effort must be expended to insure that the best practices are propagated to all members of the development team. Otherwise, the end product application may not behave in a consistent fashion.

The need to embed experienced programmers' knowledge and company best practices into the application relegates most sophisticated application development efforts to highly experienced development teams. Unfortunately, such teams are always in short demand. It would be preferable if application development could be made simpler, so that sophisticated applications could be built by less experienced developers. In the building automation field, it would be highly desirable to have an application development system that embeds expert knowledge about building automation-specific issues, freeing the application developer to design higher level, application-centric systems without worry over the device-dependent details.

Towards this end, the present invention provides an application framework that developers with varying levels of experience can use to construct complex and sophisticated building automation systems. The application framework of the invention is an object-oriented framework based on a predefined superclass from which individual application modules are derived. These modules embed various device-dependent and controller-dependent aspects of the system design, so that the application developer need not be concerned with those details.

The application framework provides a library of such modules, in the form of standard objects, assemblies and smaller function-specific applications that the user can connect together to build more complex systems. The objects are designed to communicate with one another through connection objects and surrogate objects, allowing the application modules to be distributed across multiple nodes of a network. The framework insures that these application modules know how to communicate with one another and such communication is effected without the need for the application developer to be concerned with this detail. The application framework thus embeds the knowledge and best practices of experienced building automation system designers, allowing less experienced software developers to cost effectively build sophisticated building automation systems.

For a more complete understanding of the invention, its objects and advantages, reference may be had to the following specification and to the accompanying drawings.

DESCRIPTION OF THE PREFERRED EMBODIMENT

The present invention provides an application framework that greatly simplifies developing building automation systems. The framework encapsulates the knowledge and best practices of experienced system designers, leaving the user free to create an application to solve a given building automation problem, free from worry about device-dependent details. The application framework is designed to be consistent across all devices on a building automation network, to ensure that the devices communicate and operate in a similar fashion. The application framework defines a scalable architecture that will function on a wide range of processor platforms, from a small controller to a fully equipped operator work station.

The application framework of the preferred embodiment is an object-oriented framework defined by a class hierarchy and by a domain-specific (building automation specific) model. The class hierarchy and model are each described in detail below. By way of brief overview, the class hierarchy defines through inheritance from a superclass a plurality of classes from which standard objects, assembled objects (assemblies) and application objects (applications) are created through instantiation. The user creates an application to solve a building automation problem using one or more of these standard components. The model upon which the framework is based is an application-centric model. The standard components encapsulate, and thereby hide, device-specific details so that the user creates applications in terms of the desired system functionality.

Figure 1:
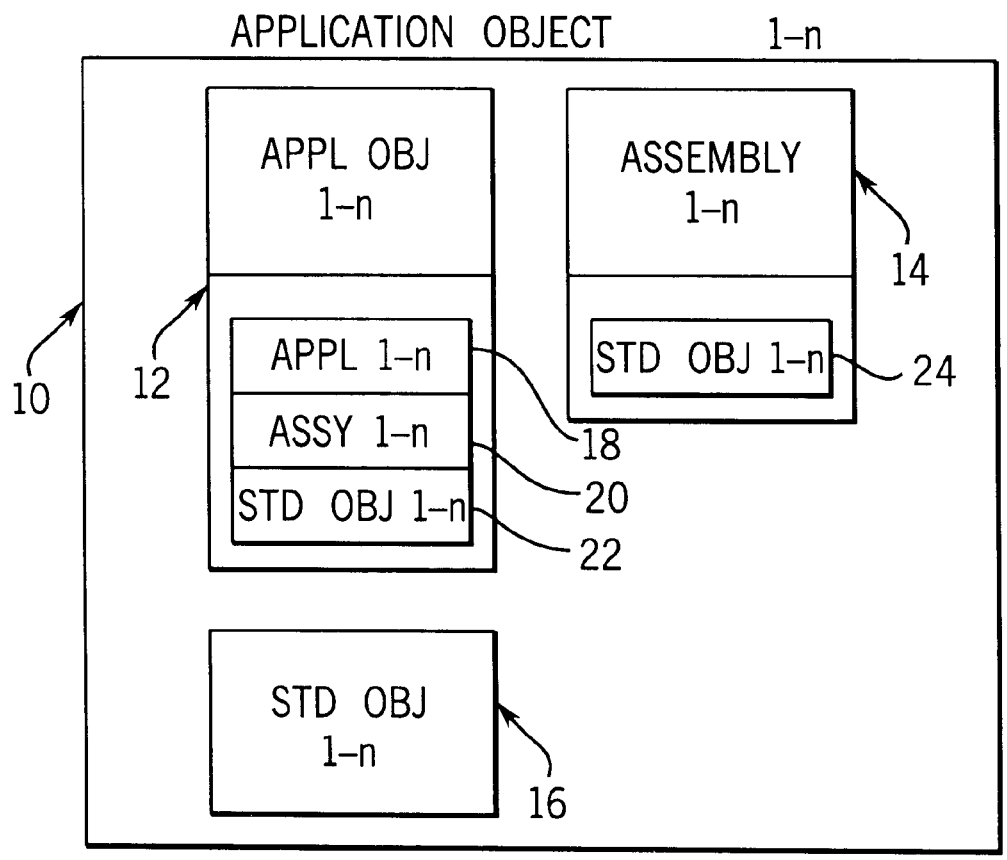
FIG. 1 is a block diagram illustrating the relationship among standard objects, assembly objects and application objects.

Referring to FIG. 1, the standard components of the preferred embodiment are illustrated to show how they are related through nesting. In FIG. 1 the shorthand notation 1–n means that the object can have one to many instances, depending on a particular building automation problem being solved. Accordingly, as illustrated, application object 10 is made up of or encapsulates application object 12, assembly object 14 and standard object 16. Using a similar nested approach, application object 12 is, in turn, made up of application object 18, assembly object 20 and standard object 22. Similarly, assembly object 14 is made up of standard object 24.

The standard object is the fundamental building block used by the application engineer to build assembly objects and application objects. The application framework of the invention provides standard object types, discussed more fully below. Instances of the standard object types are created by the application development tool and then distributed to devices on the building automation system. As noted above, such devices can range from simple, single purpose controllers to more powerful master controllers or operator work stations.

Standard objects are the basic components used to construct assembled objects or applications. Standard objects may also be created and downloaded to devices on the system to serve as independent, standalone entities. The standard object is preferably indivisible, in that it does not consist of any smaller components as far as the system user is concerned. In other words, the system user is not able to decompose a standard object to create new objects.

Each instance of a standard object is designed to reside on a single device. In this regard, the term device includes not only controllers, but also any person-machine interface devices provided on the system. Standard objects are designed to support asynchronous or event-driven operation. Execution of the standard object is preferably confined to or contained within the device on which the standard object is installed.

Although standard objects, themselves, reside in a single device, complex distributed systems are possible because the application framework defines a communication mechanism that allows standard objects to send messages to one another. Objects residing on the same device can send messages and exchange data either by directly accessing memory that is accessible to both objects, or by communicating through an optional connection object. The connection object works on a registration principle whereby an object can "sign up" with the connection object to receive messages or data from another object as such messages or data become available. The connection object thus eliminates the need for two objects to be in direct synchronism in order to communicate or share data.

Communication between objects across device boundaries is handled by a surrogate object. The surrogate object resides on one device and passes messages from remotely-distributed objects to other objects on the local device. From the viewpoint of the local device, the surrogate object represents the "alter ego" of an object located on some other device.

Figure 2:
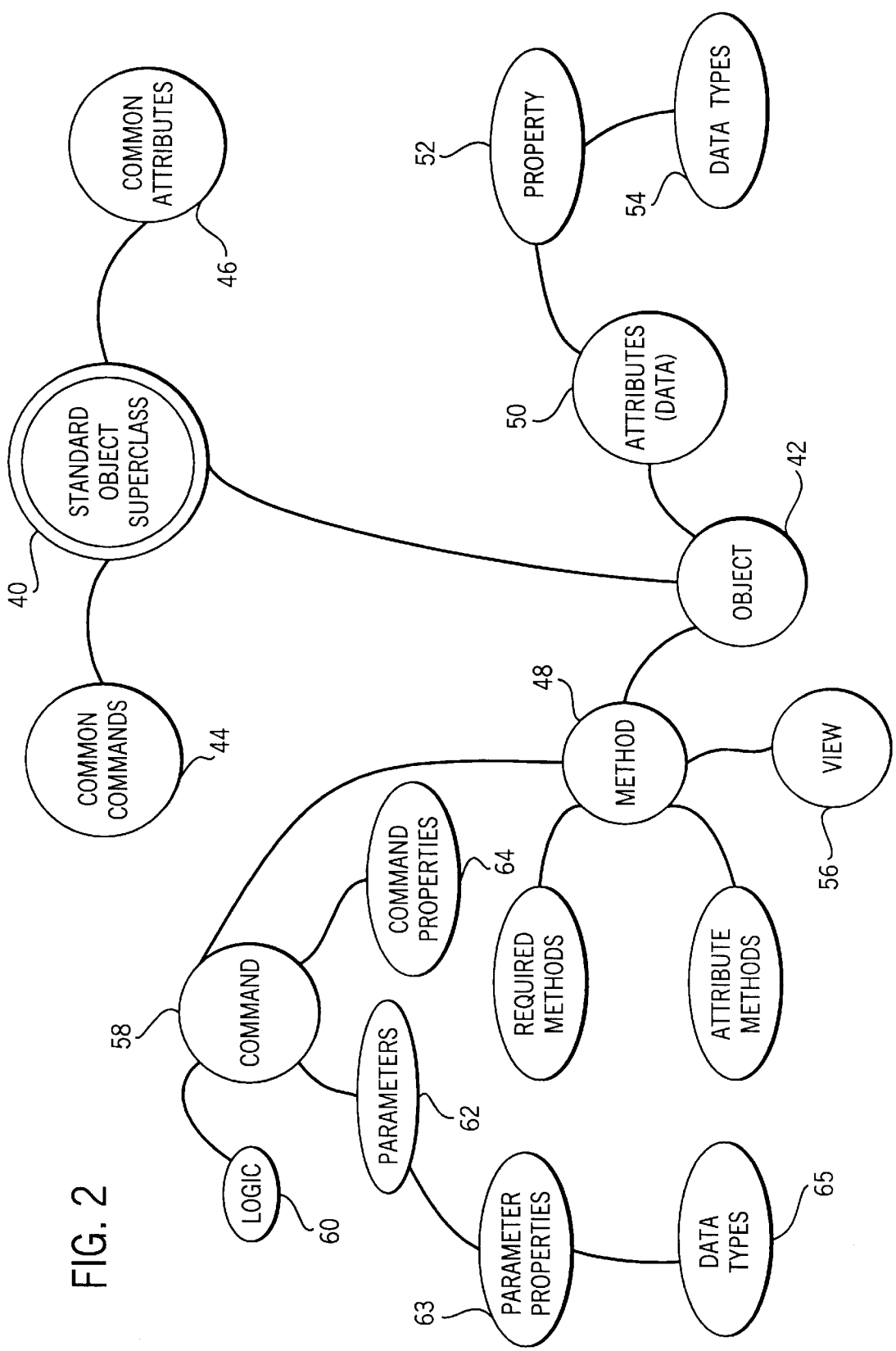
FIG. 2 is a class diagram illustrating the hierarchical configuration of the standard object superclass.

FIG. 2 shows the class hierarchy illustrating various aspects of the standard object. Specifically, FIG. 2 is a class diagram according to the application framework of the invention. The actual standard object as distributed on a controller would be an instance of the object class as illustrated in FIG. 2.

The presently preferred embodiment defines a standard object superclass 40 from which each standard object 42 is derived. The standard object superclass defines a plurality of common commands 44 and a plurality of common attributes 46. In object-oriented parlance, the common commands are methods that the standard object is capable of performing and the common attributes are data that the standard objects are capable of storing. In other words, all standard objects include common commands 44 and common attributes 46, by virtue of inheritance from superclass 40.

In addition to the common commands and common attributes, a standard object may also have additional methods 48 and attributes 50 that correspond to object-specific details. Attributes, themselves, are defined according to a predefined hierarchy. Specifically, attributes are defined in terms of a set of properties 52 that are used to describe how the attribute is defined and to specify other characteristics about the attribute. One of these characteristics is the attribute's data type 54. By defining attributes in terms of a set of stored properties, the application framework gains considerable flexibility. For example, the data type of an attribute, or some other property, could be changed without the need to rewrite all other aspects of the attribute. This flexibility would, for example, facilitate changing a date field data type from a two-digit year to a four-digit year capable of handling both 1900 millennium and 2000 millennium dates.

The methods 48 provided by each object include two important components: a view component 56 and a command component 58. The view component stores methods that are specifically defined to display different sets of predefined attributes in different predefined ways. The view component encapsulates the logic needed to display certain information on the person-machine interface so that this aspect of providing information to the user does not have to be specifically programmed into the user interface. The view component allows applications written from the application framework to display information through generic browsers that do not need to be programmed ahead of time with specific knowledge on how to display the attributes being stored by the object.

The command component provides a somewhat related function with respect to certain methods of the standard object that are available for execution through the user interface. Commands represent a subset of the available methods defined in an object. Commands are methods that are visible to outside objects, and to the user interface, so that they can be executed by another object or from the user interface by sending a message to the object. The command component encapsulates the logic 60 performed by these externally visible methods. The commands are also defined in terms of command parameters 62, parameter properties 63 and command properties 64. Parameter properties in turn include data types 65. Similar to the attribute properties 52, these parameter properties 62 and command properties 64 are used to define the available commands so that they can be flexibly changed in developing different standard objects in the application framework. Table I shows the presently preferred parameter properties and Table II shows the presently preferred command properties.

TABLE 1

Parameter Properties

| | |
|---|---|
| Parameter Properties - for all parameters | Data Required to Specify the Property Value |
| Parameter Number | Parameter name enumeration |
| Data Type | Data type enumeration |
| Default Value | Same data type as parameter |
| Additional Parameter Properties - based on data type of parameter | Data Required to Specify the Property Value |
| Boolean | 1 byte |
| None | n/a |
| All Signed and Unsigned Integers | 1, 2 or 4 bytes |
| *Min Value | Same as data type (optional) |
| *Max Value | Same as data type (optional) |
| *Units | Units enumeration |
| Float and Double Float | 4 or 8 bytes |
| *Min Value | Same as data type (optional) |
| *Max Value | Same as data type (optional) |
| *Display Precision | Display enumeration (optional) |
| *Units | Units enumeration (optional) |
| String | string |
| Maximum Length | Unsigned integer |
| Enumeration | Byte |
| *Enumeration size | Unsigned integer |
| *Enumeration set | Dictionary Entry Reference |
| Attribute Reference | See Object Naming Spec |
| None | n/a |
| Object Reference | See Object Naming Spec |
| None | n/a |

TABLE 1-continued

Parameter Properties

| | |
|---|---|
| Octet String | list of n bytes |
| Maximum Length | Unsigned integer |
| Bit String | packed set of bits |
| *Enumeration size | Unsigned |
| *Enumeration set | Dictionary Entry Reference |
| Date | 4 bytes [year (from 1900); month, day, day of week] |
| n/a | n/a |
| Time | 4 bytes [hour, minute, second, hundredths] |
| n/a | n/a |
| Structure | fixed set of elements of specified but non-homogenous types |
| Number of Elements | Unsigned integer |
| Element Data Types | ARRAY [Number of Elements] data type enumeration |
| Element Names | ARRAY [Number of Elements] of element name enumeration |
| Element Properties | List of properties for each element depending on element data types |

*property may be redirected to the value of an attribute

TABLE II

| Command Properties | Data Required to Specify Property Value |
|---|---|
| Command Number | Command enumeration |
| Number of Parameters | Byte |
| Required Access Level | Access level enumeration |
| Default Command? | Boolean |
| Accepts Priorities? | Boolean |
| Cmd Writes Attribute? | Boolean |
| Assoc String Is Cmd? | Boolean |
| Internal? | Boolean |
| Associated Attribute | Attribute enumeration (optional) |
| Associated Value | Same data type as associated attribute (optional) |

Assembly Object

Figure 3:
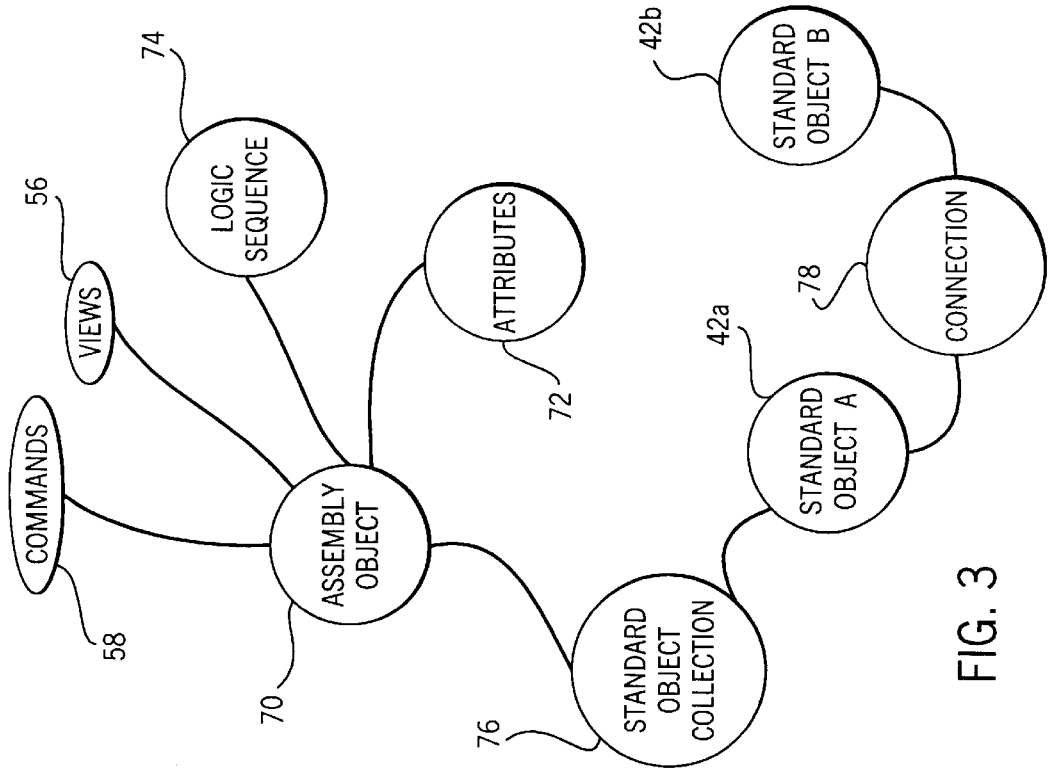
FIG. 3 is an object diagram illustrating the components of the assembly object.

Referring to FIG. 3, an assembly object 70 consists of a set of attributes 72, a logic sequence 74 and a collection of standard objects. In FIG. 3 the collection 76 includes one or more standard objects, such as standard objects 42a and 42b as well as the objects' interconnections. Connection object 78 is illustrated in FIG. 3 as providing a connection between standard objects 42a and 42b.

An assembly defines a new object type with an attribute set of its own (stored as attributes 72). The purpose of the assembly object is to create new components that can be used in the system as if they were predefined objects. For example, an assembly object might be defined by a system engineer to introduce a new object type prior to release of that object type as a standard object implemented within the controllers. Assemblies may also be used by application designers to create object types of their own.

Examples of useful assembly objects include the START—STOP assembly that is made up of a pair of binary input and binary output standard objects together with additional logic. A ROOM assembly might consist of a temperature analog input object, a set point analog output object, a door contact binary output object, a lighting binary output object and a set of schedule objects.

The presently preferred embodiment restricts all parts of an assembly to reside on one controller. However, an assembly may have its attributes read or written by an object on another controller. An assembly object may be downloaded as a standalone object, or as a component of a larger application. In the presently preferred implementation an assembly may not be nested within another assembly. If desired, assemblies may be locked such that their internal components and logic sequence are not visible to the user of the application framework. This feature can be useful for encapsulating proprietary logic or for protecting certain code from being modified by persons lacking the requisite skill.

The architecture by which an assembly object is defined (FIG. 3) allows an assembly to be "promoted" to the status of a standard object, if desired. To do so an attribute is set, causing the assembly object to hide its components from other objects. Thus, although the assembly object may be comprised of other standard objects, it would appear as a standard object itself to other entities.

The application framework of the invention defines a plurality of different assembly types, which uniquely identify different types of assemblies within the application framework library. All assemblies have the same base set of attributes in addition to the assembly type attribute. The Table immediately below (Table III) lists the presently preferred assembly object attributes and provides additional detail about how these attributes may be used.

TABLE III

| Attribute Name | Data Type | Flags (note 1) | Initial Value | Range/Other Type-Dependent Properties |
|---|---|---|---|---|
| Reliability | Multistate | | Reliable | Same as enumerations defined for the reliability attribute in the Common Object Spec |
| Assembly_SubType | String | | | 20 characters |
| Revision_Level | Structure of Byte: major Byte: minor | W | major = 1, minor = 0 | |
| Class_ID | Unsigned_Integer | I | 0 | Run Time assignment |
| Period | Unsigned_Long | WCA | 0 | Range of unsigned long |
| Locked | Boolean | I | 0 | 1 = Locked, 0 = Not Locked |
| Err | Multistate | I | 0 | Same as enumerations defined for the reliability attribute in the Common Object Spec |
| Ers | Integer | I | 0 | Index that was being accessed when the error occurred |
| Last_ERR | Multistate | I,W | 0 | Same as enumerations defined for the reliability attribute in the Common Object Spec |
| Last_ERS | Integer | I,W | 0 | Index that was being accessed when the error occurred |

TABLE III-continued

| Attribute Name | Data Type | Flags (note 1) | Initial Value | Range/Other Type-Dependent Properties |
|---|---|---|---|---|
| Error_Trap | Integer | I | 0 | Error trap offset in logic |
| Restart_Trigger | Boolean | C,A | 0 | 1 = Restart, 0 = No Restart |
| Startup | Boolean | | 0 | 1 = Startup, 0 = Not_Startup |
| Shutdown | Boolean | | 0 | 1 = Shutdown, 0 = Not_Shutdown |
| Component | Array of Object_References | I,C,A | | |
| Component_Name | Array of Unsigned_Integer | I | | |
| Trigger_List | Array of Attribute_References | I | | |
| User_Information | List Of Bytes | I | 0s | Size will vary based on available space in device. |
| Slice_Count | Unsigned_Integer | I,F | 0 | Will rollover (Only calculated in debug mode) |
| Execution_State | Multistate | I,F | Idle | 0 = Idle, 1 = Executing, 2 = Read_Relinquish, 3 = Write_Relinquish, 4 = Execute Relinquish, 5 = Wait_Relinquish, 6 = Time_Slice_Exceeded 7 = Stopped 8 = Single_Step 9 = Slice_Termination (Only calculated in debug mode) |
| Execution_Trigger | Multistate | I | None | 0 = None, 1 = Period Expired, 2 = COV_Received 3 = Write_Attribute 4 = Execute_Message, 5 = Trigger_Message, 6 = Restart_Message |
| Bandwidth_Exceeded | Boolean | I,F | 0 | 1 = Bandwidth_Exceeded 0 = Bandwidth_OK (Only calculated in debug mode) |
| Execution_Count | Unsigned_Long | I,F | 0 | (Only calculated in debug mode) |
| Execution_Needed | Boolean | I | False | |
| Execution_Time | Unsigned_Long | I,F | 0 | Units = Milliseconds (Only calculated in debug mode) |
| Relinquished_Object | Object_Reference | I | | |
| Debug_Mode | Boolean | W,I | False | 0 = Not in Debug Mode |

Note 1:
Flags W — Writeable, Z — Priority allowed on write, E — Trigger on write, D — default attribute, I — internal, N — Value Not Required, C — Configurable, A — Archive, K — Key Attribute, P — Input, R — Reliability, F — PMI Refresh Short descriptions of the purpose of each attribute are given below.

Reliability—whether the object is reliable or not. See the Common Object Specification for a list of pre-defined values of this attribute. The Reliability attribute is set by the logic sequence of the assembly. The enumerations of the err variable and the reliability attribute are defined to be the same so that assembly designer can write the err variable to the reliability attribute, if desired.

Assembly SubType—The name given to the assembly subtype by the assembly designer.

Revision Level—The revision of this assembly.

Class ID—The unique class identifier. Each assembly type requires a unique class id. The object type is always ASM_OBJ_TYPE. This attribute allows unique identifiers to be assigned to assembly subtypes. The ClassID is assigned by the device at runtime.

Period—The period at which the assembly is to execute. This attribute is specified in seconds. Each time the period expires the assembly will execute.

Locked—Flag to indicate if this assembly was defined to be "locked". This attribute signals the MGT to not allow access "inside" of the assembly. Decompilation should not be allowed and the user should not be allowed to view the component objects of the assembly.

Err—Errors reported by any of the logic sequences are reflected here. Errors reported from any functions will be written to this attribute by the interpreter. BASIC functions will be available to read the value of this attribute.

Ers—When an error is entered into the err variable the interpreter will update the error source with the index of the value operand of the function being executed.

Last Err—The last error that occurred in a logic section of this assembly is stored in this attribute. The Err attribute is continually updated as functions are executed. The Last Err attribute latches the last error that was encountered.

Last Ers—The error source that caused the last error in a logic section of this assembly is stored in this attribute. The Ers attribute is continually updated as functions are executed. The Last Ers attribute latches the last error source.

Error Trap—This attribute specifies the offset to which the interpreter will jump if an error is encountered. A function is provided in BASIC to set the value of this error trap.

Restart Trigger—Flag to indicate that this assembly is designated to run when the restart message (restart method) is sent by the operating system. If this attribute is set the assembly will execute its control logic sequence when the restart message is received. Note that this is not the same as the Restart system variable that is mentioned in the Basic specification. This flag corresponds to the restart trigger specified in the Basic document. The restart system variable will be implemented as a pcode statement that will return TRUE if the execution count is 0, otherwise it will return FALSE.

Startup—Flag to indicate that this is the first time that this assembly is being run as a result of a WHILE Basic trigger. It is the responsibility of the trigger logic section to set this attribute to TRUE when the WHILE trigger is received. The assembly will set this value to FALSE after each execution.

Shutdown—Flag to indicate that this is the last time that this assembly is being run as a result of a WHILE Basic trigger. It is the responsibility of the trigger logic section to set this attribute to TRUE when the WHILE trigger is received. The assembly will set this value to FALSE after each execution.

Component—This attribute provides access to the component list of the assembly. This attribute returns object names and bind information.

Component Name—This attribute provides access to the functional names of the components of the assembly.

Trigger List—This attribute provides access to the trigger list of the assembly.

User Information—This attribute provides a generic means for the MGT to store library and other tool required information about the assembly. It will include the required function and global subroutine lists.

Slice Count—The number of times the interpreter had to preempt this control logic sequence. This may be to execute a higher priority assembly or because the assembly exceeded the maximum allotted execution time. This count does not include voluntary yields such as the sending of off-box messages.

Execution State—Current execution state of the assembly. The table lists the valid states.

Execution Trigger—This attribute gives information about the reason for the last (or current) execution of this assembly.

Bandwidth Exceeded—Flag to indicate that the assembly cannot execute its logic sequence at the rate specified in the period.

Execution Count—The number of times this assembly has completed execution.

Execution Needed—Flag to indicate that this assembly needs to be executed.

Execution Time—The amount of time in msec that was required for the last complete execution of the control logic sequence.

Relinquished Object—This internal object identifies the object which has caused the assembly to relinquish. This attribute returns the object reference of the object if the execution state is READ_RELINQUISH, WRITE_RELINQUISH, EXECUTE_RELINQUISH, or READPRIORITY_RELINQUISH. Otherwise it will return NULL.

Debug Mode—If this attribute is TRUE the assembly will perform additional calculations and report changes in attributes that are helpful for debugging. These attributes are Slice_Count, Execution_State, Bandwidth_Exceeded, Execution_Count, and Execution_Time.

In addition to the base set of attributes, the assembly designer may define a set of user-defined attributes for the assembly. Like standard objects, these attributes may be read or written by other objects. The assembly can store a variety of different types of information that may be categorized as follows:

fixed attribute values—values for all attributes inherited from the common object and assembly object types;

user defined attributes—a list of user defined attributes, including names, values and all attribute properties;

variable table attribute values—values for all attributes that are defined by the logic variable lists (described below);

command list—a table of user-defined command definitions for the assembly. The list includes command names and parameter definitions, along with referenced to pcode and variable tables for each command;

view definitions—a list of views which are available for the assembly. The definition includes view type, view name, group names, screen layout and attribute list for each view;

component list—a list of objects and their attribute values that are contained and created by the assembly. The list will contain any required connection objects;

validate logic pcode—the pcode to be executed when a write attribute is received;

validate logic variable list—variables for the validation logic;

trigger list—a list of attribute references from which this assembly will request change of value (COV) reports;

trigger logic pcode—the pcode (intermediary code) to be executed when a COV message is received;

trigger logic variable list—variables for the trigger logic;

control logic pcode—the pcode to be executed when the assembly executes;

control logic variable list—variables for the control logic;

command x pcode—the pcode to be executed when command x is received, where x represents the command name as specified in the command list. Typically there is an additional command pcode list for each defined command;

command x variable list—the variables for command x pcode, where x represents the command name as specified in the command list. Typically there is an additional command variable list for each defined command; and user information—a list of bytes containing information that is used only by the development system. This is where question and answer, graphics and library information can be stored. In addition, the function list and global subroutine list will be stored here.

Objects within an assembly can be directly connected to each other, by connecting an attribute on one to an attribute of the other. The defined action is that the value of the source object attribute is passed to the destination object attribute. This data transfer is performed independent of the logic sequence which may be defined for the assembly. The presently preferred application framework architecture supports interconnection within assemblies where assembly components are connected to each other and where assembly components are connected to the attributes of the assembly itself.

The assembly logic sequence is where much of the useful program functionality is embedded. The logic sequence consists of an algorithm that is executed under user-defined circumstances (trigger conditions). The logic sequence executes in sequential order. A logic sequence may consist of one or more of the following elements:

(a) references to attributes of the assembly;
(b) references to the attributes of the component objects of the assembly;
(c) standard function calls; and
(d) other control logic (IF-THEN-ELSE, WAIT, etc.). Logic sequences are not required within an assembly. Thus the logic sequence may be empty.

The presently preferred implementation supports a number of standard functions. Many of the standard functions are those needed to perform mathematical computations and logic decisions (math and Boolean). In addition, specific building automation functions are also included (HUMIDITY, SPAN, FLOW).

Application Objects

Application objects are collections of standard objects, assemblies and nested applications, optionally connected together, which solve a problem or meet a building automation need. Like assemblies, an application object also consists of a set of attributes and a logic sequence.

Typically an application is developed using the application framework to generate the application whereupon it is downloaded to the system to implement a solution. The application may be as simple as a single object or as complex as numerous objects, assemblies and nested applications interconnected together. Typical applications might include variable air volume (VAV) terminal box control, rooftop unit control, air handling unit control, chiller plant control, unit vent control and fan coil control. In addition to these comparatively simple applications, the application framework can be used to develop very sophisticated interconnected systems to perform business-related functions such as real-time pricing control, or to implement a smoke evacuation system that automatically takes over control of the air handling system in the event of a smoke or fire detection.

Components of the application may be interconnected to each other and to attributes of the application. The components may be nested within one another to provide a great deal of flexibility in hierarchically building application solutions. The application framework of the invention allows users to create applications quite easily, by simply connecting up or nesting objects, assemblies and other applications provided as base components distributed with the framework.

Figure 4:
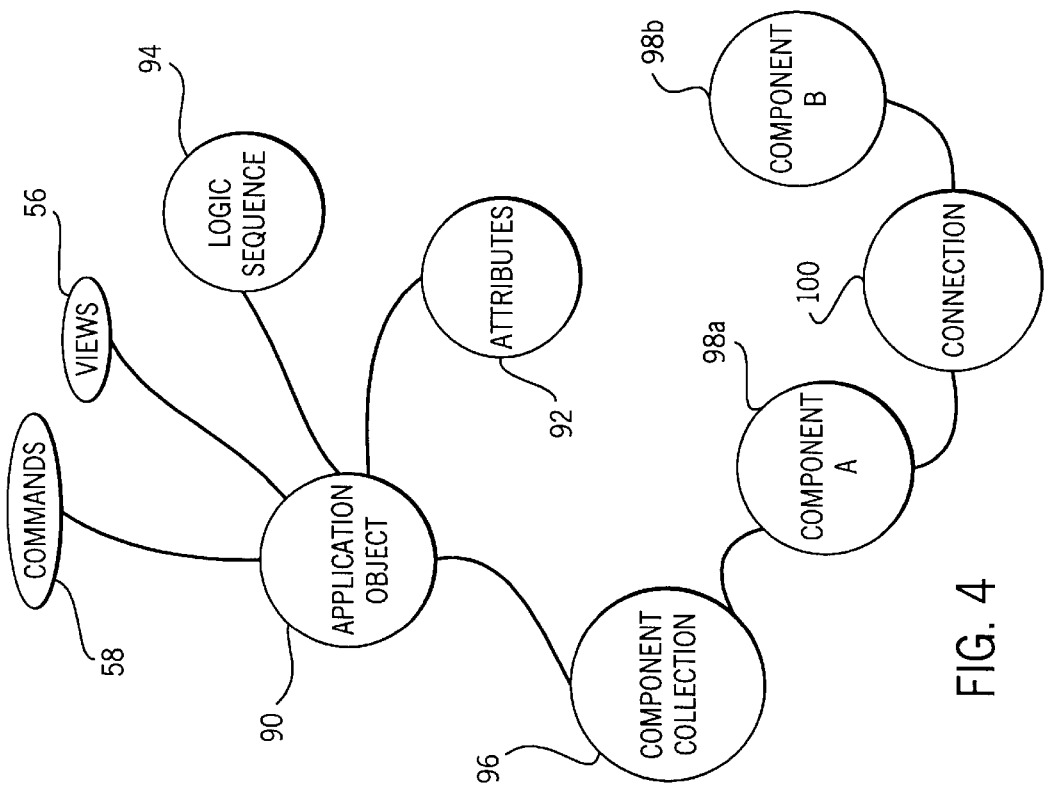
FIG. 4 is an object diagram illustrating the components of an application object.

Applications consist of a definition portion and a set of components with their interconnections. This is illustrated in FIG. 4. Referring to FIG. 4, the application object 90 comprises a definition portion that includes a set of attributes 92, a logic sequence 94 and a collection 96 in the form of a list of the applications' components and their locations. The application object inherits commands 58 and view methods 56 from the standard object. As illustrated the collection can comprise a plurality of components (objects, assemblies or other applications). FIG. 4 illustrates component 98a and component 98b coupled through connection 100. Connection 100 can be implemented simply by reading and writing to one of the objects' attributes, or it may be implemented using a separate connection object as an intermediary.

Unlike standard objects and assembly objects, an application's components may be distributed across one or more devices over a network. This includes the interconnection information for the components, yielding a great deal of flexibility. Location of individual components as well as the application definition is ultimately under control of the user working with the application framework.

The application object attributes 92 include a predefined set of fixed attributes that are common to all application object types. These fixed attributes are essentially the same as those illustrated in Table III above. In addition, the information stored in application objects comprise essentially the same types of information as described above for assembly objects. The interconnection of application objects under the application framework is quite flexible. The architecture supports any two objects being interconnected either directly or through a connection object. Applications can be interconnected in more ways than assembly components described above. Specifically, the following connection examples are supported in the presently preferred embodiment:

(a) application components connected to each other;
(b) application components connected to the attributes of the application itself;
(c) applications connected to other applications; and
(d) standalone standard objects or assemblies connected to other standalone objects or assemblies, or to other applications.

The logic sequence 94 of an application object consists or an algorithm which is executed under user-defined circumstances (trigger conditions). The logic sequence executes in sequential order. In general, a logic sequence may consist of one or more of the following elements:

(a) references to attributes of the application;
(b) references to attributes of the component objects of the application;
(c) references to the attributes of objects outside the application;
(d) standard function calls; and
(e) other control logic (IF-THEN-ELSE, WAIT, etc.).

The logic sequence may also be empty.

Figure 5:
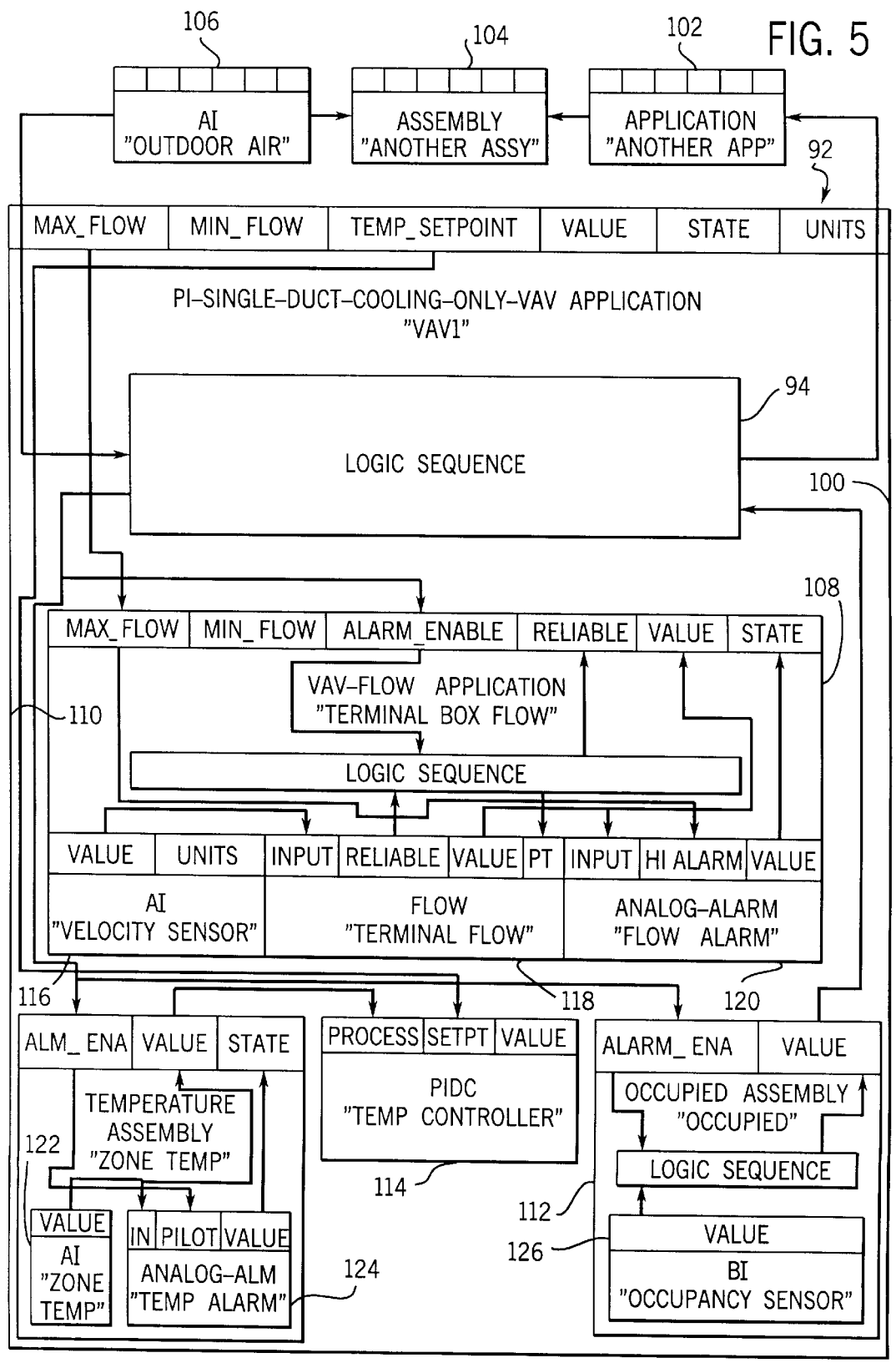
FIG. 5 is a block diagram illustrating an exemplary application object, showing its constituent components and showing how it interacts with other application objects and standard objects.

FIG. 5 presents an example of an application assembled from exemplary components defined by the application framework. The example of FIG. 5 is illustrated to show some of the possibilities of the invention. It is not intended as an exhaustive or limiting example of the capabilities of the invention in its broader aspects.

FIG. 5 illustrates a single-ducted, cooling-only, variable air volume (VAV) application at 100. The application supplies messages or events to another application 102, which in turn may supply messages to assembly 104. Application 100 can communicate with other applications, assemblies and standard objects. Thus application object 100 receives messages from standard object 106, and analog input (AI) object supplying an outdoor air temperature signal in this example. Note that the standard object 106 can also provide the outdoor air signal to other objects, in this ca se to assembly object 104.

Application object 100 stores a plurality of attributes, illustrated at 92. These attributes are the data stored and manipulated by application object 100 in performing its VAV control function. The logic sequence performed by application object 100 is diagrammatically illustrated at 94. Note by the data flow arrows in the diagram of FIG. 5 that the logic sequence 94 receives the outdoor air signal from object 106 and supplies a signal to application object 102. Likewise, logic sequence 94 supplies various signals to other embedded applications and assemblies that make up application object 100.

Specifically, application 100 contains an embedded application object 108, assembly objects 110 and 112, and a standard object 114. In the example of FIG. 5 application object 108 is a VAV flow application that is in turn made up of nested standard objects, specifically analog input object 116, flow object 118 and analog alarm object 120.

In a similar fashion, assembly object 110 is made up of standard objects, including analog input object 122 and analog alarm object 124. Assembly object 112 also encapsulates a standard object, binary input object 126.

FIG. 5 illustrates how the comparatively more complex application object 100 is made up of one or more standard objects, assembly objects or other application objects. These components are "connected" by message passing mechanisms whereby data may be exchanged between objects. The application framework of the invention provides two basic mechanisms for passing data between objects: a pull mechanism and a push mechanism. The pull mechanism involves having one object read attribute values directly from the other object, by accessing the attribute data store of that object directly. The pull mechanism is useful for many synchronous operations where the logic sequence associated with an object needing information is responsible for obtaining the information from the other object. The push mechanism uses a special connection object that other objects may register with to be supplied with data from other objects automatically as those other objects change in value. The connection object serves as an intermediate data store that ensures all objects subscribing to that connection object are constantly supplied with current data values. The connection object relieves the subscribing object from the responsibility to obtain current data values from other objects. The push mechanism is useful in many asynchronous operations, where a given object may be involved in an asynchronous task, and thus unable to wait for another object to respond to its request for current data.

The application framework of the invention can be deployed in a variety of different distributable platforms. The presently preferred embodiment embeds the application framework in a programming tool that the application developer uses in creating applications to solve problems or meet building automation customer needs. The standard objects and general purpose assembly objects are stored in a library that the application developer may draw upon in using the development tool. Although the tool can take many forms, the object-oriented nature of the application framework lends itself well to a simple dialog box and graphical programming environment in which the application developer selects standard objects and assemblies by placing them on the screen and by then entering pertinent information about these objects by interacting with a series of dialog boxes. The dialog boxes, in effect, prompt the user to supply information that is stored according to the data structures illustrated in FIGS. 2–4 and in Tables I–III above.

The application framework of the invention thus greatly simplifies the task of developing building automation solutions. Unlike conventional device-specific application development paradigms, the framework offers an application-centric paradigm in which the application developer is encouraged to think about solving the building automation problem without becoming distracted by device-specific details. The application framework embeds expert knowledge about device-specific details into the standard objects, so that the application developer does not need to be an expert in the device-specific details. Moreover, the application framework lends itself well to nesting and integrating smaller applications into larger applications. Thus the expertise captured in such smaller applications can be directly reused by the developer or integrator of larger system solutions. This can greatly reduce the level of expertise required in developing comparatively complex and sophisticated building automation applications.

While the invention has been described in its presently preferred form, it will be understood that the invention is capable of certain modification without departing from the spirit of the invention as set forth in the appended claims.

What is claimed is:

1. An application framework for defining building automation applications that perform building automation functions in a predetermined environment comprising;

a plurality of standard object classes stored in computer readable memory, said standard object classes defining a plurality of standard objects through instantiation such that said standard objects encapsulate attributes and methods pertaining to predetermined physical relationships defined by physical laws associated with said environment; and a connection object class stored in computer readable memory, said connection object class defining at least one connection object for exchanging data between at least two of said standard objects and for defining an application object comprised of said at least two of said standard objects, said application object providing at least one predetermined application-specific building automation function, said application-specific building automation function being defined in said application object without encapsulation within said at least two of said standard objects, whereby said application framework permits change in said application-specific function without requiring change in said at least two of said standard objects.

2. The application framework of claim 1 further comprising:

a common object superclass stored in computer readable memory that defines a plurality of common objects through instantiation such that said common objects have attributes for storing data and have methods for processing stored data; and wherein said plurality of standard object classes are defined through inheritance from said common object superclass.

3. The application framework of claim 1 wherein said at least two of said standard objects are each provided with executable code to run on individual processor-based controllers.

4. The application framework of claim 1 wherein said at least two of said standard objects are each provided with executable code to run on a single processor-based controller and wherein said application object is distributed across a plurality of controllers.

* * * * *